United States Patent
Rajamani et al.

(10) Patent No.: US 6,195,607 B1
(45) Date of Patent: Feb. 27, 2001

(54) METHOD AND APPARATUS FOR OPTIMIZING $NO_X$ EMISSIONS IN A GAS TURBINE

(75) Inventors: Ravi Rajamani, Schenectady; George Charles Goodman, Niskayuna, both of NY (US); Narendra Digamber Joshi, Cincinnati; Richard Bradford Hook, Sharonville, both of OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/347,719

(22) Filed: Jul. 6, 1999

(51) Int. Cl.[7] .................................. F02C 3/22; F02C 9/28

(52) U.S. Cl. ........................ 701/100; 60/39.37; 60/39.465

(58) Field of Search ........................... 701/100; 60/39.03, 60/39.06, 39.12, 39.281, 39.36, 39.37, 39.465, 738, 755

(56) References Cited

U.S. PATENT DOCUMENTS

| | | |
|---|---|---|
| 4,700,542 * 10/1987 | Wang | 60/598 |
| 4,910,957 3/1990 | Moreno et al. | 60/39.06 |
| 4,928,481 5/1990 | Joshi et al. | 60/737 |
| 5,309,709 * 5/1994 | Cederwall et al. | 60/39.23 |
| 5,323,604 6/1994 | Ekstedt et al. | 60/39.36 |
| 5,365,732 11/1994 | Correa | 60/39.281 |
| 5,373,692 12/1994 | Correa | 60/39.06 |
| 5,761,895 6/1998 | Chu et al. | 60/39.03 |
| 5,850,732 12/1998 | Willis et al. | 60/39.36 |

* cited by examiner

Primary Examiner—Tan Nguyen
(74) Attorney, Agent, or Firm—John F. Thompson; Jill M. Breedlove (57) ABSTRACT

A fuel control system for controlling the ratio of ring temperature adjustment in rings of a combustor in a gas turbine. The fuel control system consists of employing a computer to perform the steps of; defining an operational boundary inner ring temperature adjustments versus outer ring temperature adjustments that defines a safe operating region for the annular combustor of the gas turbine; calculating a point of operation of the inner ring temperature adjustment versus the outer ring temperature adjustment within a safety margin of the operational boundary, wherein nitrous oxide ($NO_x$) emission levels of the gas turbine is reduced; and regulating the ring temperatures to maintain a near global minimum point of operation, while maintaining normal operation of the gas turbine.

32 Claims, 8 Drawing Sheets fig. 1 fig. 2 fig. 3 fig. 4 fig. 5 fig. 6 fig. 7 fig. 8

METHOD AND APPARATUS FOR OPTIMIZING $NO_x$ EMISSIONS IN A GAS TURBINE

BACKGROUND OF THE INVENTION

This invention relates generally to fuel-air optimization in annular gas turbine combustors and more particularly concerns a system for continual on-line trimming of the fuel flow rate to rings of a annular combustor to optimize NOx emissions.

Figure 1:
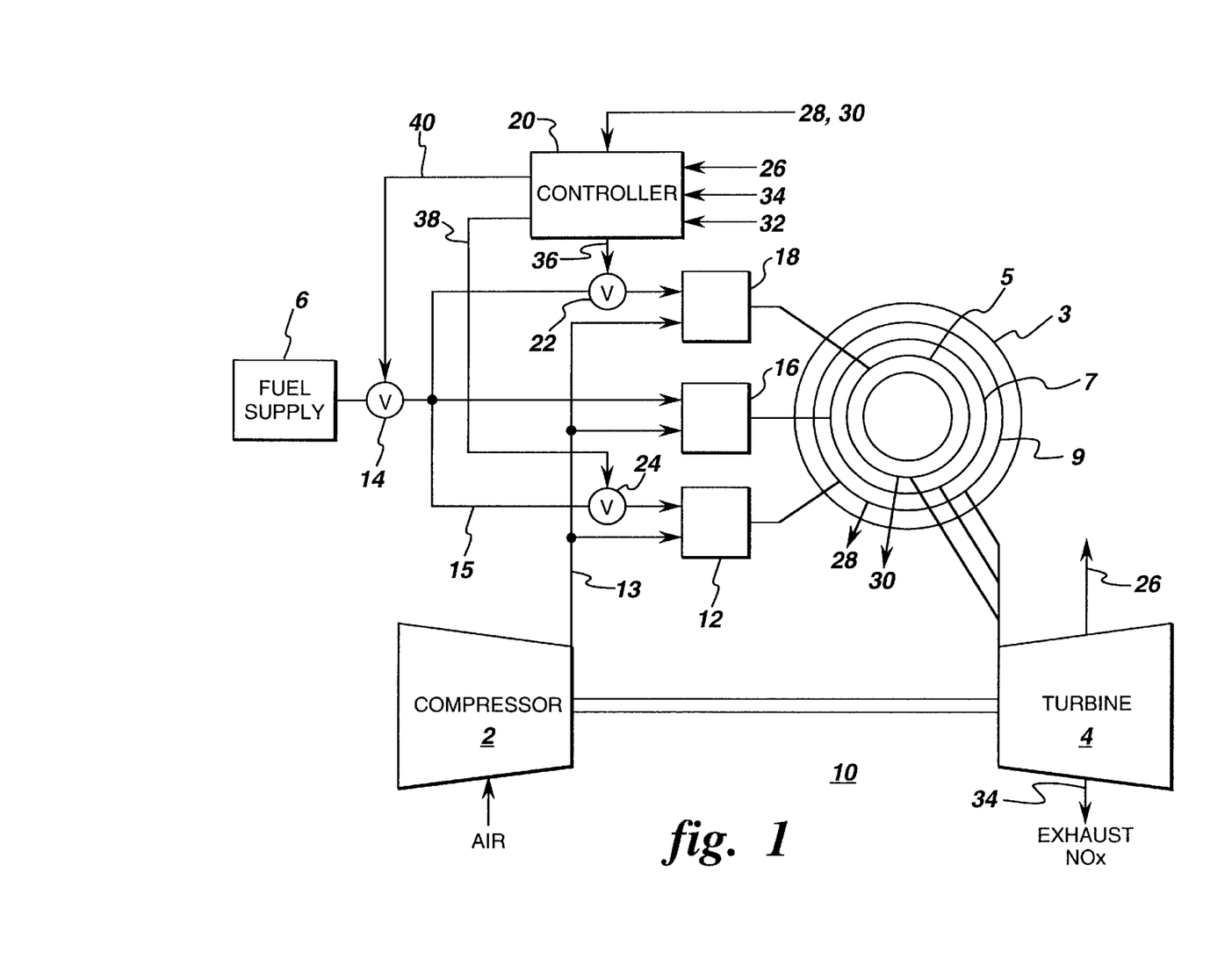
FIG. 1 is a schematic representation of a conventional annular combustor based gas turbine.

FIG. 1 shows a gas turbine combustor system 10 from a Dry Low Emissions (DLE) Industrial Engine, such as the GE LM6000™, which includes a compressor 2, a combustor 3 and a turbine 4. Fuel is mixed with compressed air from the compressor 2 and burned in the combustor 3. The resulting flow of combustion products out of the combustor 3 drives the turbine 4, which in turn drives a load (not shown) as well as the compressor 2. The exhaust from the turbine 4 is eventually released to the atmosphere. One type of combustor commonly used today is the so-called annular combustor. One exemplary embodiment of the annular combustor comprises a plurality of separate rings, wherein each ring is connected to the compressor 2 and the fuel supply provides combustion products to drive turbine 4. This combustor is fully described in U.S. Pat. No. 5,323,604.

FIG. 1 further shows one embodiment of a DLE type annular combustor 3 having three rings 5,7, and 9. The rings define a combustion chamber (not shown) to which a fuel-air mixture from an inner ring premixer 12, a pilot ring premixer 16, and an outer ring premixer 18 is injected. Compressed air enters each of the premixers 12, 16, and 18 via an air line 13 and fuel enters via a fuel line 15. A main valve 14, also referred to as a pilot value, is disposed in the fuel line 15 to throttle the flow of fuel into each of outer ring premixer 12 and inner ring premixer 18. Alternatively, the fuel and air may be directly injected into the combustion chamber without premixing. This results in near-stoichiometric, high temperature combustion which leads to copious production of varying combinations of oxides of Nitrogen, which are generally referred to as $NO_x$. Premixing the fuel and air prior to combustion results in lean premixed combustion, which produces lower flame temperatures and thus lower $NO_x$ emissions. Flame temperature in a ring of the combustor is proportional to the fuel-air-ratio in the operating region of a DLE type combustor, hence ring flame temperature and fuel-air-ratio are used interchangeably in the present specification.

Reducing emissions of harmful gases such as $NO_x$ into the atmosphere is of prime concern. It is, therefore, desirable for gas turbine-based power plants burning natural gas to employ means for dramatically reducing $NO_x$ emissions. Natural gas-fired gas turbines produce no measurable particulate exhaust of oxides of Sulfur ($SO_x$) and, if the combustion process is properly controlled, very little $NO_x$ or Carbon Monoxide (CO).

There is a need for real time, on-line trimming of the fuel flow to each ring of a annular combustor in accordance with minimizing total $NO_x$ emissions. There is an additional need for a trim system to carry out the real time, on-line trimming which is retrofittable to existing gas turbines. The trim system must be such that its failure will not affect the baseline operation of the gas turbine.

BRIEF DESCRIPTION OF THE INVENTION

The above-mentioned needs are addressed by the present invention which provides apparatus and method for minimizing $NO_x$ emissions of a gas turbine. The present invention comprises a fuel control system for controlling the ratio of ring temperature adjustment in at least one ring of an annular combustor in a gas turbine. The fuel control system consists of a computer to perform the steps of; 1) defining an operational boundary of inner ring temperature adjustment versus an outer ring temperature adjustment that defines a safe operating region for the gas turbine; 2) calculating a operating point of the inner ring temperature adjustments versus the outer ring temperature adjustment within a safety margin of the operational boundary, wherein $NO_x$ emission levels of the gas turbine is substantially minimized; and 3) regulating each ring temperature adjustment to maintain a near global minimum point of operation while maintaining normal operating parameters.

DETAILED DESCRIPTION OF THE INVENTION

The present invention addresses the issue of reducing emissions of harmful $NO_x$ gases produced by a gas turbine. $NO_x$ emissions are very sensitive to combustor temperature in a gas turbine and the amount of $NO_x$ produced is an exponential function of temperature. In this specification $NO_x$ refers to various oxides of Nitrogen. The present invention is also adapted to operate the gas turbine to minimize high levels of acoustic noise, to eliminate turbine blow-out based on unacceptably lean fuel, and to reduce high levels of Carbon Monoxide (CO).

Referring to FIGS. 1 through 4, in which like elements correspond with like numbers, a controller 20 is coupled to an inner ring fuel valve 22, a pilot ring fuel valve 14, and an outer ring fuel valve 24 to regulate the flow of fuel from fuel supply 6 to respective premixers 18,16, and 12 via an inner ring fuel signal 36, an pilot ring fuel signal 40, and an outer ring fuel signal 38. A plurality of control signals are coupled from the turbine engine to controller 20, including, for example, dynamic pressure $P_x$ (26), (the dynamic peak-to-peak dynamic pressure of combustor 3), $NO_x$ (34), inner ring temperature (30), outer ring temperature (28), and fuel valve position status (32). It is understood that the above identified control signals are only a representative subset of the control signals that may be used by controller 20 to control the gas turbine. It is also understood that signals $P_x$ dynamic pressure 26, outer ring temperature 28, inner ring temperature 30, and $NO_x$ emission level 34, may be calculated in the controller from other measured signals, and not necessarily measured directly by sensors.

Figure 2:
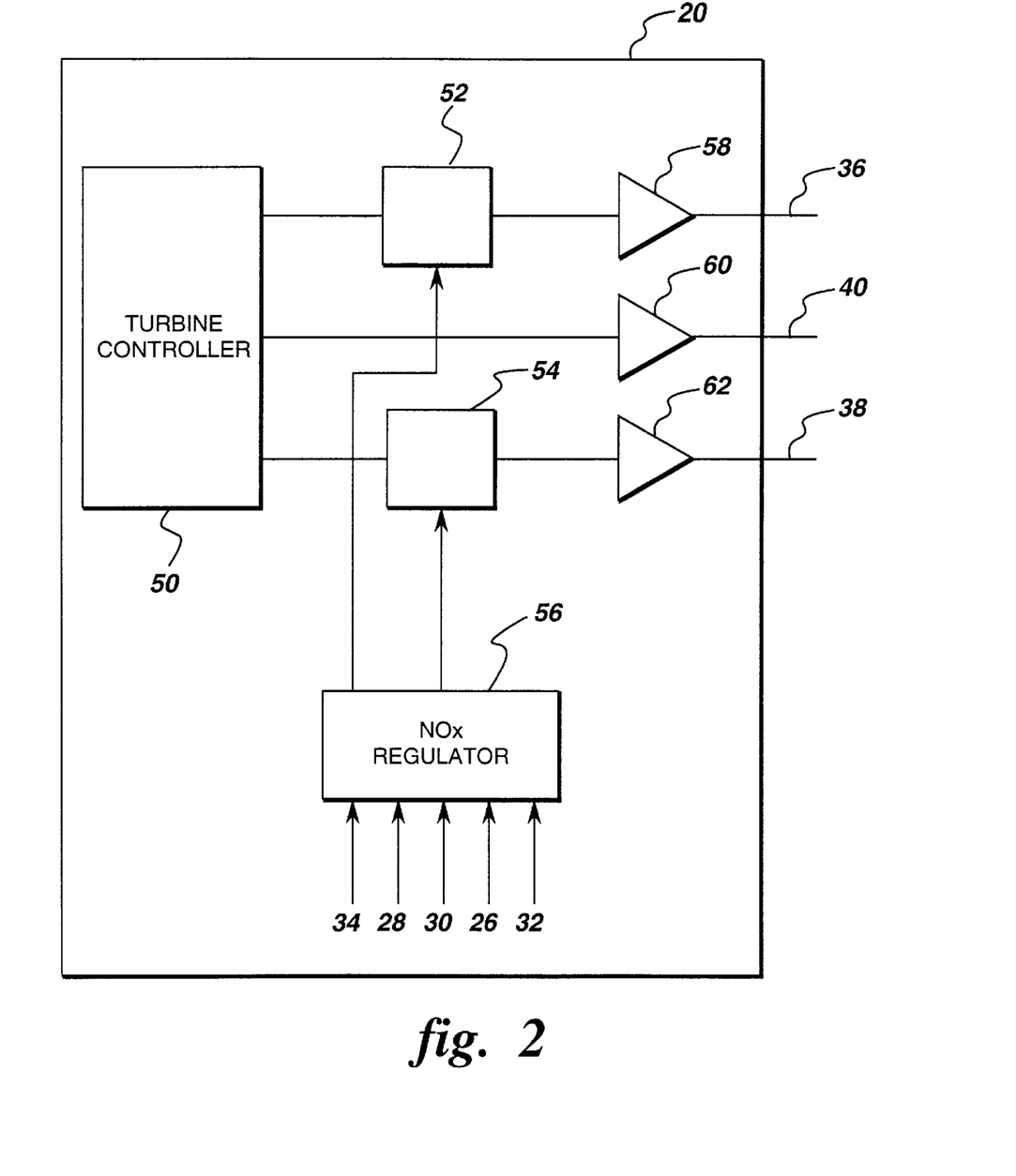
FIG. 2 is a schematic representation of the controller having a $NO_x$ regulator of the present invention.

FIG. 2 illustrates further detail of controller 20 which comprises a turbine controller 50 and a $NO_x$ regulator 56. Controller 20 further comprises an inner ring fuel adjuster 52, outer ring fuel adjuster 54, which inner ring adjuster 52 and outer ring adjuster 54 are respectively coupled to an inner ring fuel driver 58 and an outer ring fuel driver 62. Pilot fuel driver 60 is coupled to turbine controller 50. $NO_x$ regulator 56 is coupled to inner ring fuel adjuster 52 and outer ring fuel adjuster 54. Because of the connection arrangement, $NO_x$ regulator 56 only has the ability to adjust the fuel flowing to inner ring fuel valve 22 and outer fuel ring valve 24. Inner fuel driver 58 generates inner ring fuel signal 36, and outer ring fuel driver 62 generates outer ring fuel signal 38. Pilot ring fuel signal 40 is derived from the difference between the total fuel flow and the sum of inner fuel flow and outer fuel flow.

Main fuel valve 14 acts to regulate the total fuel flow to the combustor. Inner ring fuel valve 22 and outer ring fuel valve 24 is coupled to inner ring 5 and outer ring 9. Further, the regulation of fuel flow by inner ring fuel value 22 and outer ring fuel valve 24 is limited by turbine controller 50. Because of the limitation imposed on the fuel control system by the above description, design constraints of the gas turbine which define the dynamic operating range of combustor 3 is also controlled by turbine controller 50. In the event that $NO_x$ regulator 56 fails, turbine controller 50 continues to control the operation of the gas turbine in a fail safe mode. $NO_x$ regulator 56 is designed to make adjustments only to the fuel flow of inner ring 5 and outer ring 9.

Figure 3:
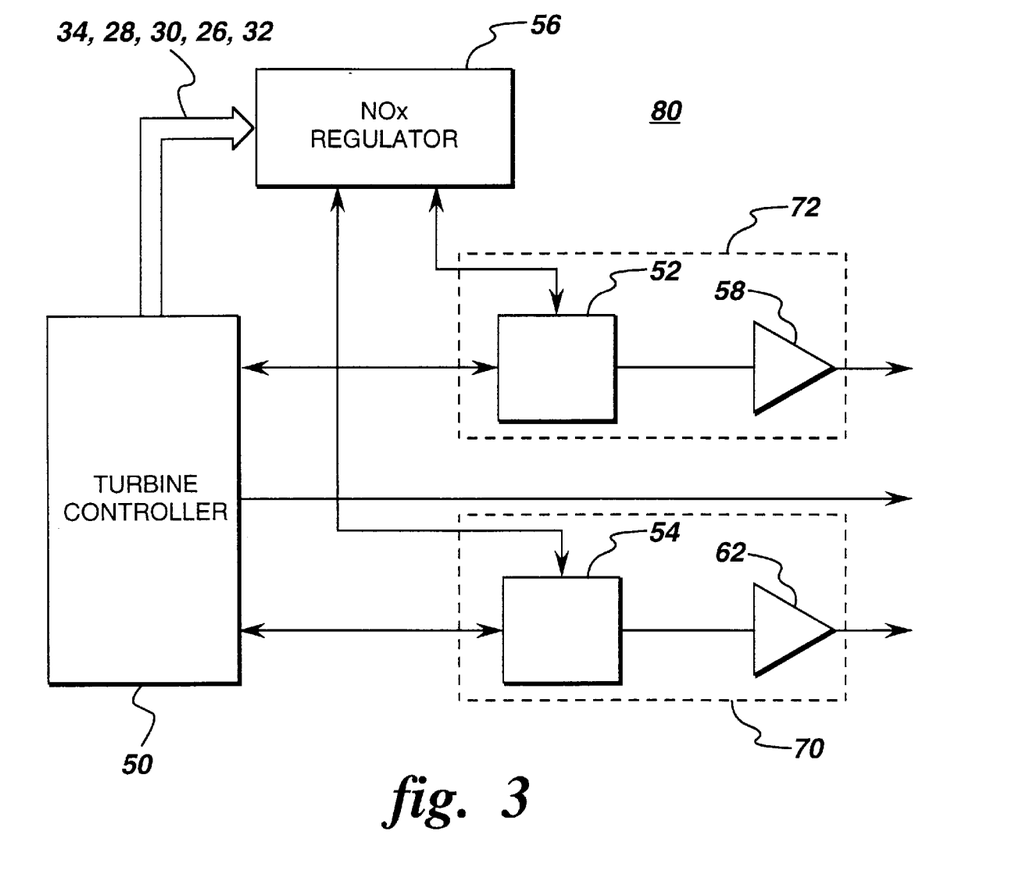
FIG. 3 is a further schematic block diagram representation of a controller and a $NO_x$ regulator of the present invention.
Figure 4:
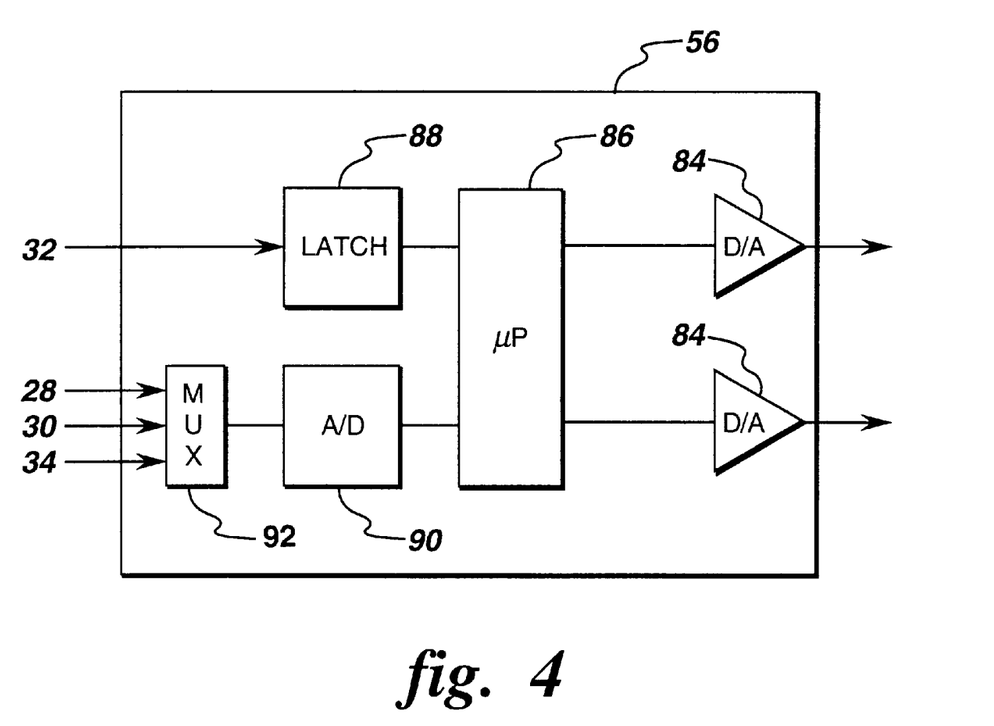
FIG. 4 is a further schematic block diagram of the $NO_x$ regulator of FIG. 3.

In an alternative embodiment of the present invention $NO_x$ regulator 56 is a stand alone control device 80 rather than being integrated into controller 20, as illustrated in FIG. 3. Inner ring fuel adjuster 52 and inner ring fuel valve driver 58 may also be integrated into a single adjuster and inner ring valve driver 72. Correspondingly, outer ring fuel adjuster 54 and the associated driver 62 may be integrated into outer ring adjuster and driver 70. In this embodiment $NO_x$ regulator 56 comprises a micro-processor 86, wherein micro-processor 86 is coupled to at least one digital-to-analog converter 84, a digital latch 88 to read digital signal 32, and an analog-to-digital converter 90, as illustrated in FIG. 4. Analog-to-digital converter 90 may also be coupled to an analog multiplexer 92 so as to read analog signals 28, 30, and 34. $NO_x$ regulator 56 may alternatively comprise a digital signal processor having the above described digital and analog functions built in.

$NO_x$ regulator 56 operates fuel valves 22 and 24 so as to control the fuel flow to inner ring premixer 18 and outer ring premixer 12. By regulating fuel flow in this manner the amount of fuel from the outer ring 9, pilot ring 7, and inner ring 5 of combustor 3 is regulated. The fuel flow determines fuel-air-ratio in each ring of combustor 3, which in turn determines the temperature in each ring. Because the temperatures in inner ring 5, pilot ring 7, and outer ring 9 determines the amount of $NO_x$ produced by combustor 3, $NO_x$ regulator 56 acts to control $NO_x$ emissions in combustor 3, as is further described below.

Figure 5:
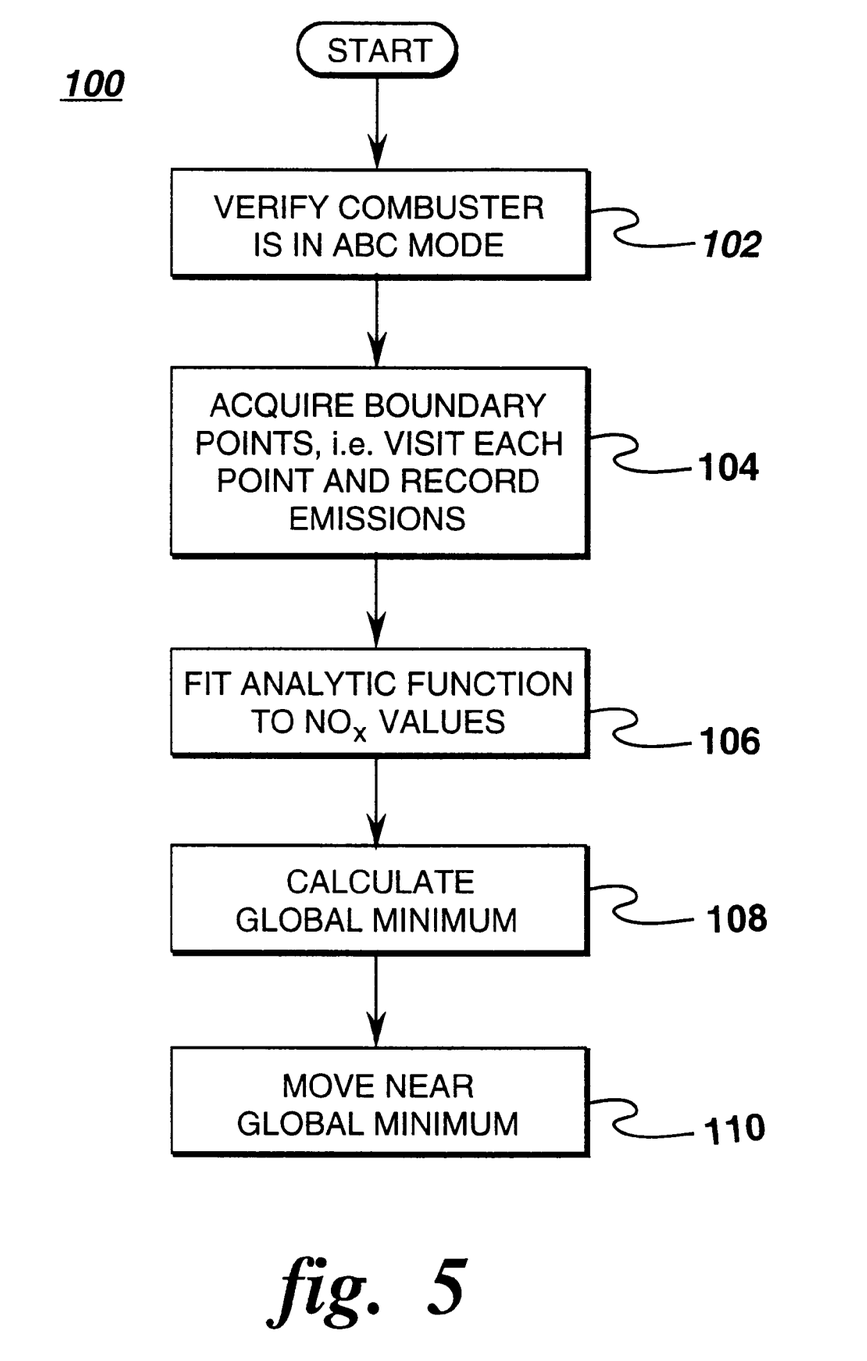
FIG. 5 is a system level flow diagram of the method of regulating $NO_x$ emmisions of the present invention.
Figure 6:
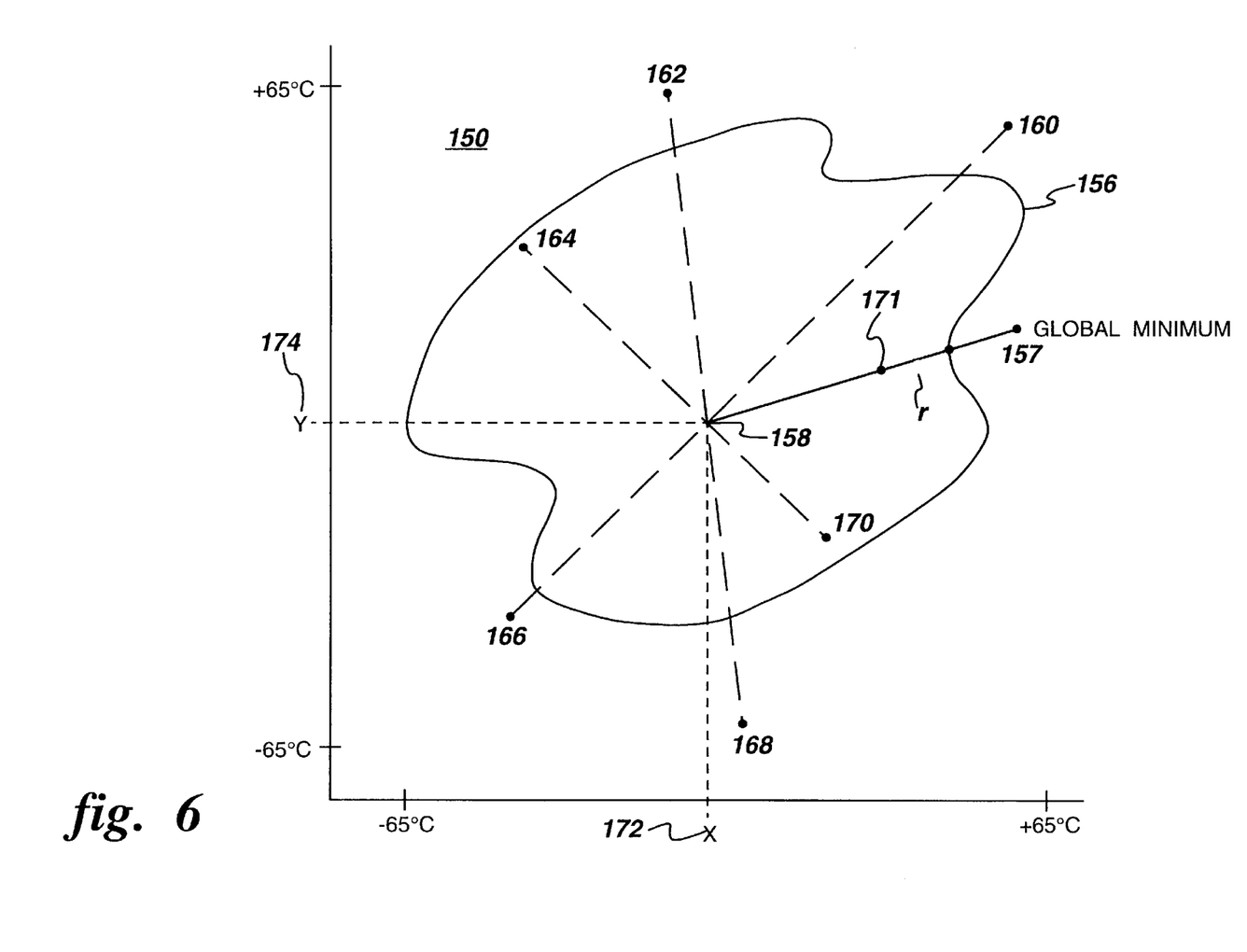
FIG. 6 is a graphical illustration of the outer temperature reference adjustment versus the inner temperature reference adjustment of the present invention.
Figure 7:
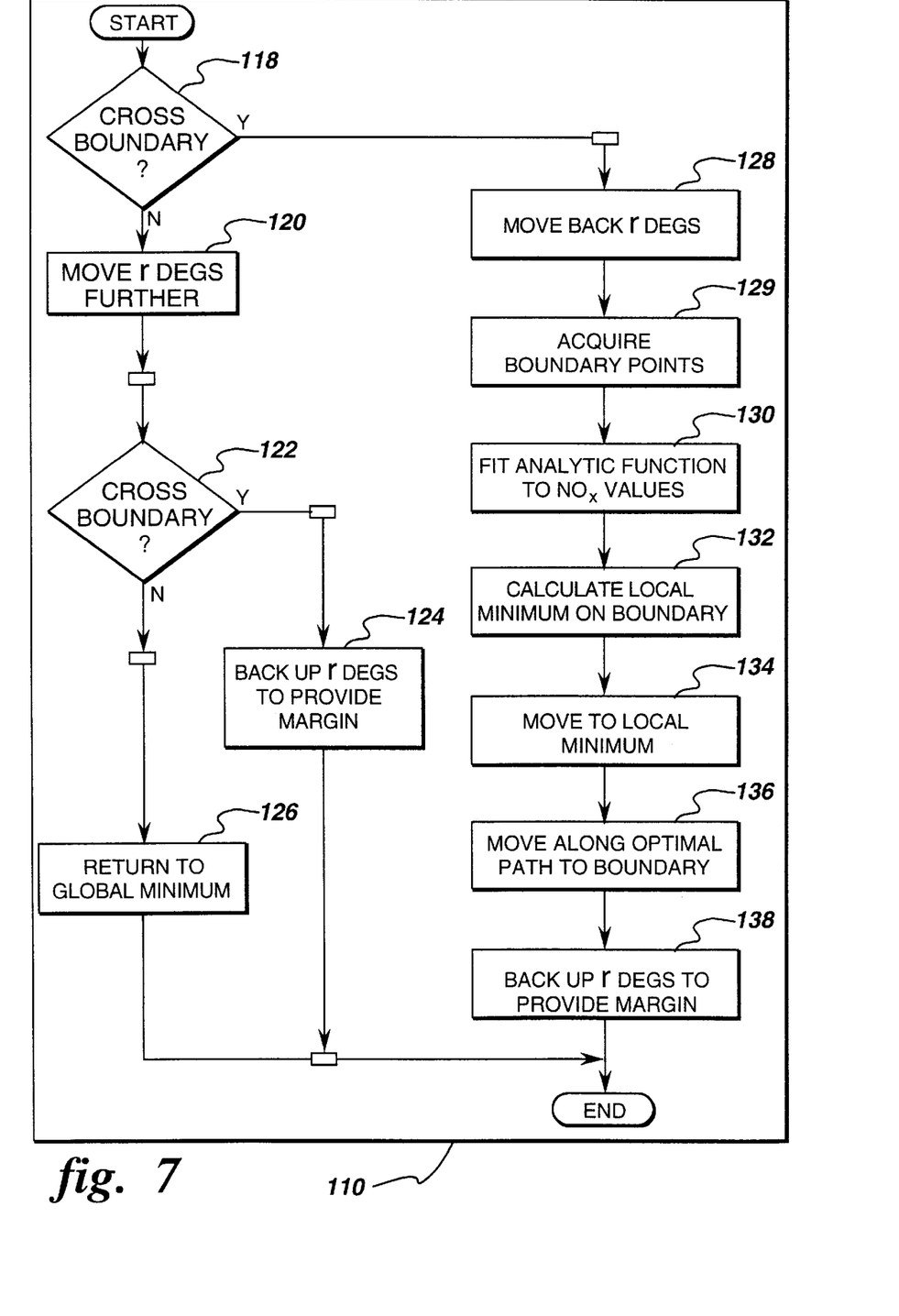
FIG. 7 is further detail of the flow diagram in FIG. 3 of the control process of the present invention.

Referring to FIGS. 5 through 7, in which like elements correspond to like numbers, a method for controlling inner ring fuel valve 22 and outer ring fuel valve 24 is described. FIG. 5, illustrates a process flow diagram 100 for determining the near optimum operating point to minimize $NO_x$ emissions in a gas turbine.

First, a determination is made as to the operating mode of the gas turbine, that is, whether inner ring 5 and outer ring 9 are under control of turbine controller 50. Step 102. Typically, this data is provided to $NO_x$ regulator 56 from turbine controller 50 via fuel valve status line 32 (FIG. 2). It is understood that the present invention operates in the mode where inner ring 5, pilot ring 7, and outer ring 9 are concurrently being controlled by turbine controller 50, identified as the ABC mode. Other modes of operation are within the scope of the present invention, such as, modes AB and BC, wherein mode AB is defined as the mode when inner ring valve 22 is shut off and mode BC is defined as the mode when outer ring valve 24 is shut off.

Next, a specified number of gas turbine operating points are identified along an operation boundary 156 defined by combustion chamber temperatures at inner ring 5 and outer ring 9. One exemplary illustration 150 of these operating points are shown, for example, by operating points 160,162, 164, 166,168, and 170, illustrated in FIG. 6. Each of operating points 160,162,164,166,168,170 was selected to be disposed along three planes which intersect at nominal operating point 158. It is understood that any method for selecting the operating points may be utilized. The goal is to select a specified number of operating points disposed along operating boundary 156. At each of these operating points $NO_x$ levels are measured during normal operation of the gas turbine. The point selection and $NO_x$ measurement process step is illustrated by step 104 of FIG. 5. The number of boundary points identified is typically at least 6 so as to provide sufficient data points for a second order curve fit analysis to be conducted on the data points. A boundary point 156 is defined as an operating point of the gas turbine engine within a defined preferred operating region. The preferred operating region is defined as the region where a number of conditions are generally met, such as, when the dynamic operating range of combustor 3 is satisfied, when gas turbine acoustic noise is low, when the gas turbine is not in a blow-out range, when CO is low, and when $NO_x$ is below a high upper limit. $NO_x$ typically comprise about 25 parts per million volume exhaust gas. These conditions are generally met when dynamic pressure $P_x$ is within a specified pressure range during operation, typically, between about zero and about 15,000 Pascals. The more specific dynamic pressure range is gas turbine specific, and is typically provided by the gas turbine manufacturer. The non-preferred operating region, which is any area not in the preferred operating region, is to be avoided.

FIG. 6 further provides a graphical illustration of the fuel temperature adjustment range of a typical annular combustor of a gas turbine. The range of inner ring temperature adjustment is from about negative 65 degrees Celsius to about positive 65 degrees Celsius above and below a nominal operating ring temperature 158 that is set by turbine control 50. This inner ring temperature adjustment range is represented by the horizontal axis of FIG. 6. The range of outer ring temperature adjustment is from about negative 65 degrees Celsius to about positive 65 degrees Celsius above and below nominal operating ring temperature 158. This outer ring temperature adjustment range is represented by the vertical axis of FIG. 6.

Next, the specified operating points 160, 162,164,166, 168, and 170 are used to generate coefficients $a_0$ through $a_n$ (in this example n=6) for a curve fit function that relates a resulting polynomial to $NO_x$. This polynomial function is at least a second-order polynomial function having the form identified in equation 1.

$$NO_x = a_0 + a_1 x + a_2 y + a_3 xy + a_4 x^2 + a_5 y^2 \qquad \text{equation 1}$$

the variable "x" corresponds with the inner ring temperature adjustment 172 and the variable "y" corresponds with the outer ring temperature adjustment 174, illustrated in FIG. 6. The curve fit function corresponds with step 106 illustrated in FIG. 5. Equation 1 is used when $NO_x$ regulator 56 is in the ABC mode. In the AB mode "x"=zero and in the BC mode "y"=zero.

Next, the "x" and "y" value where $NO_x$ is minimized is calculated by taking a partial derivative of equation 1 with respect to "x" and a partial derivative with respect to "y", represented by step 108 of FIG. 5. The resulting point is defined as the global minimum 157 and is depicted in FIG. 6. It is noted that the global minimum 157 may be in the non-preferred region.

Finally, the gas turbine inner and outer ring temperature adjustments are incremented so that the gas turbine is operating either at the global minimum 157 or near the global minimum 157 within the preferred operating region, step 110 of FIG. 5. When the gas turbine is operating at near the global minimum $NO_x$ emission levels are reduced in a range from about 10 percent to about 20 percent from levels occurring when the present invention in not utilized. In this specification near global optimum operating point is therefore defined as the operating point in which the $NO_x$ emission levels are reduced in a range from about 10% to about 20% from nominal operating emission levels. The process for operation of the gas turbine at or near the global minimum is further described next.

Referring to FIGS. 6 and 7, in which like elements correspond to like numbers, a method for operating the gas turbine at or near global minimum 157, is further described.

It is first appropriate to define an safety margin "r", which is the margin as measured by inner ring temperature adjustment and outer ring temperature adjustment, in which the gas turbine operates within the preferred region. Safety margin "r" is typically about 15 degrees Celsius. It is understood that the safety margin is dependent upon the accuracy of the control system and the response of the gas turbine and may change as appropriate for any given gas turbine system.

Next, the inner ring temperature adjustment and outer ring temperature adjustment are incremented so that the gas turbine operation is adjusted starting at the nominal operating point 158 (FIG. 6), along a global margin line extending from nominal operating point 158 to global minimum 157, as identified by step of FIGS. 5 and 7. At each increment it is determined whether the operating boundary 156 has been crossed, in which case the gas turbine would be operating in the non-preferred region 152, as identified by step 118 of FIG. 7.

If the operating boundary 156 has not been crossed the gas turbine is adjusted along global margin line by safety margin "r", as identified by step 120 of FIG. 7. If operating boundary 156 has again not been crossed it is assumed that the operation of the gas turbine at the safety margin is as close to the global minimum 157 as the safety margin will allow, as such, the gas turbine continues to operate at a inner ring temperature adjustment and outer ring temperature adjustment represented by the safety margin. These process steps are identified by blocks 122 and 126 of FIG. 7.

If the operating boundary 156 was crossed after the gas turbine was incremented by the safety margin in step 120, the gas turbine is reset to the operating point 171 just before the safety margin, which point is assumed to be near global optimum operating point 157. These process steps are identified by blocks 122 and 124 in FIG. 7.

Figure 8:
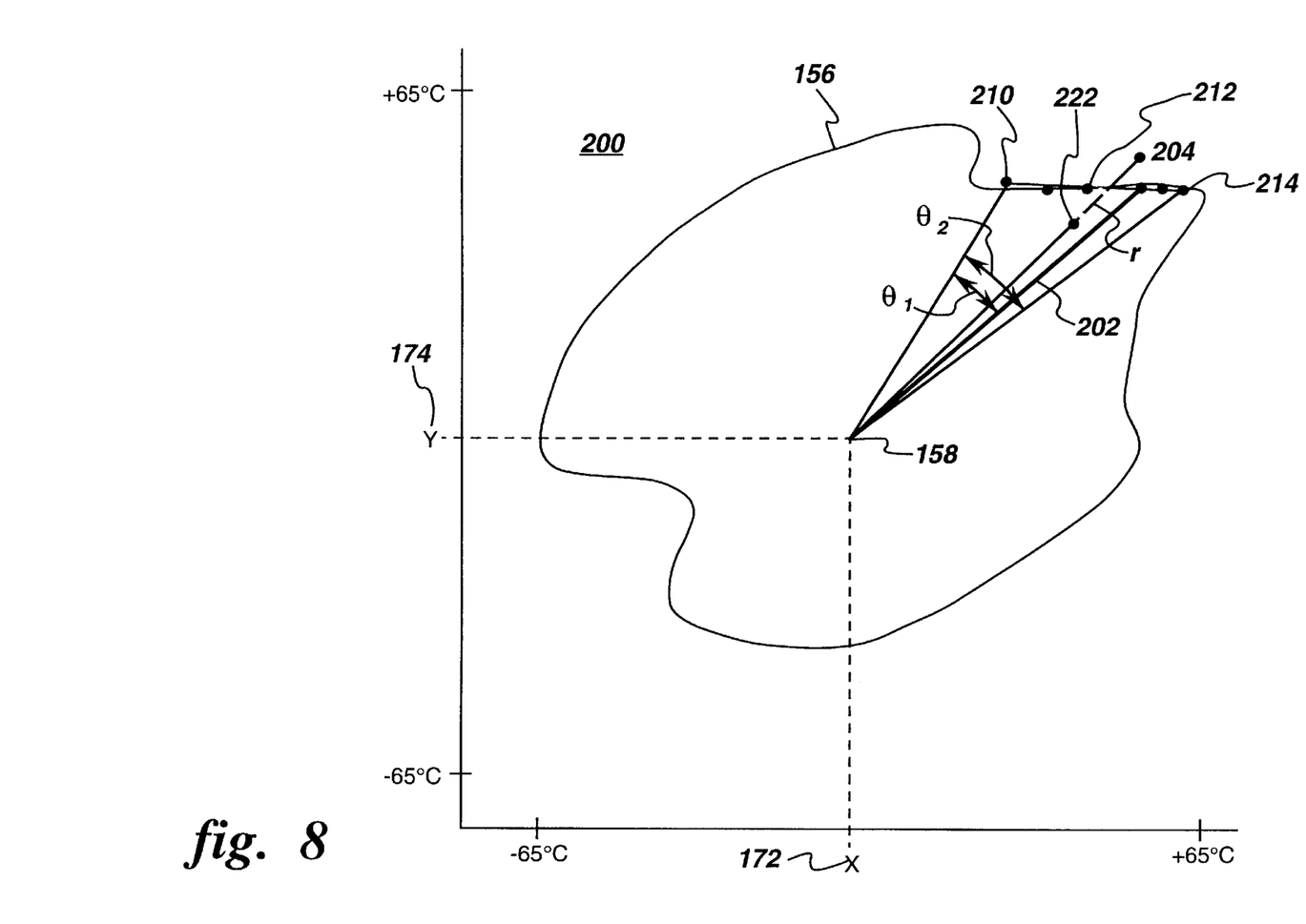
FIG. 8 is a graphical illustration of the arc that defines the global optimum operating point of the gas turbine of the present invention.

Referring to FIGS. 7 and 8, in which like elements correspond to like numbers, the method for determining the minimum $NO_x$ operating point for the gas turbine is further described. If after incrementing the gas turbine as identified in step 112 the operating boundary 156 is crossed, the respective inner and outer combustor ring temperature are reversed by the safety margin along the global margin line 159, as identified by steps 118 and 128 in FIG. 7. Next, in step 129 the fuel control system is exercised to generate at least an additional three points of operation wherein $NO_x$ reading are taken to generate operating points 210, 212, 214, as illustrated in FIG. 8, so that an additional curve fit function may be calculated as a function of the angle θ subtended at 158 with respect to the line segment 210-158 using equation 2, as identified by step 130.

$$NO_x = b_0 b_1 \theta + b_2 \theta^2 \qquad \text{equation 2}$$

In equation 2, $b_0$, $b_1$, and $b_2$ are coefficients that are calculated using a least squares regression or curve fit function from $NO_x$, values 210, 212, and 214. Angle θ is any one of two specified angles ($\theta_1$ and $\theta_2$) defined by the set operating points 158, 210, and 212 ($\theta_1$), and 158, 210, and 214 ($\theta_2$), as illustrated in FIG. 8. The purpose of this calculation is to determine a local minimum point of operation 204 along the arc defined by operating points 210, 212, and 214 near the operating boundary 156. The derivative with respect to the θ angle is determined and solved for $NO_x$ equal zero. From this calculated value an angle θ corresponding to local minimum $NO_x$ point 204 is identified, as illustrated by step 132. A local minimum line 202 is next determined, wherein local minimum line 202 is defined as the line between nominal operating point 158 and the local minimum point 204 step 134. The gas turbine is incremented from nominal operating point 158 along local minimum line 202 until the operating point 222 step 136, which is a safety margin "r" away from the local minimum point 204 step 138. Operating point 171 is the near global operating point of the gas turbine. The near global operating point is defined as the operating point at which $NO_x$ emission levels are reduced in a range from about 10 percent to about 20 percent from nominal $NO_x$ emission levels when the gas turbine is operating and the present invention is not utilized.

The methods described herein may be used to optimize the output of any chemical reactor which has several parameters that can be controlled and several output variables. The method described herein which reduce $NO_x$ emissions by optimizing ring flame temperatures can also be used simultaneously with Carbon Monoxide reducing algorithms, such as those described in U.S. Pat. Nos. 4,910,957 and 4,928,481.

It will be apparent to those skilled in the art that, while the invention has been illustrated and described herein in accordance with the patent statutes, modifications and changes may be made in the disclosed embodiments without departing from the true spirit and scope of the invention. It is, therefore, to be understood that the appended claims are intended to cover all such modifications and changes as fall within the true spirit of the invention.

What is claimed is:

1. A fuel control method for controlling the ratio of ring temperature adjustment in rings of a combustor in a gas turbine, said ring temperature control method comprising the steps of:

defining an operational boundary of inner ring temperature adjustment versus an outer ring temperature adjustment;

calculating a global minimum of operation of said inner ring fuel temperature adjustment versus said outer ring fuel temperature adjustment within a safety margin of said operational boundary, wherein the $NO_x$ emission level of the gas turbine is reduced; and regulating said ring temperatures to maintain said inner ring temperature adjustment and said outer ring temperature adjustment near said global minimum point of operation, while maintaining normal operation of the gas turbine.

2. The method as recited in claim 1, wherein said operational boundary is identified when said combustor dynamic pressure is greater than a specified limit.

3. The method as recited in claim 2, wherein said combustor dynamic pressure has a specified limit in a range from about zero to about 15,000 Pascals.

4. The method as recited in claim 1, wherein the gas turbine is verified to be in an ABC mode.

5. The method as recited in claim 4, wherein the gas turbine is verified to be in an AB mode.

6. The method as recited in claim 5, wherein the gas turbine is verified to be in a BC mode.

7. The method as recited in claim 1, wherein the $NO_x$ emissions are measured at a predetermined number of operational points within said operational boundary.

8. The method as recited in claim 7, wherein said predetermined number of operational points is at least six.

9. The method as recited in claim 8, further comprising the step of performing a polynomial curve-fit on said operational points.

10. The method as recited in claim 9, further comprising the step of calculating a global minimum operation point.

11. The method as recited in claim 10, further comprising the step of setting said inner ring temperature adjustment and said outer ring temperature adjustment so as to cause said gas turbine to operate within a safety margin of said global minimum.

12. The method as recited in claim 11, wherein said step of calculating said global minimum operating point further comprising the step of determining whether a preferred boundary has been crossed.

13. The method as recited in claim 12, further comprising the step of setting said inner ring temperature adjustment and said outer ring temperature adjustment so as to cause said gas turbine to revert to an operating point one safety margin unit away from said global minimum if the preferred boundary has been crossed.

14. The method as recited in claim 13, further comprising the step of determining whether the preferred boundary has been crossed.

15. The method as recited in claim 14, further comprising the step of setting said inner ring temperature adjustment and said outer ring temperature adjustment so as to cause said gas turbine to revert to an operating point one safety margin unit away from said global minimum if the preferred boundary has been crossed.

16. The method as recited in claim 15, further comprising the step of setting said inner ring temperature adjustment and said outer ring temperature adjustment so as to cause said gas turbine to revert to said global minimum operating point if the preferred boundary was not crossed.

17. The method as recited in claim 12, further comprising the step of setting said inner ring temperature adjustment and said outer ring temperature adjustment so as to cause said gas turbine to revert to an operating point being one safety margin away from said global minimum if the preferred boundary has been crossed.

18. The method as recited in claim 17, wherein the $NO_x$ emissions are measured at a predetermined number of operational points within said operational boundary.

19. The method as recited in claim 18, wherein said predetermined number of operational points is at least three.

20. The method as recited in claim 19, further comprising the step of performing a polynomial curve-fit on said operational points.

21. The method as recited in claim 20, further comprising the step of calculating a local minimum operation point based on a first derivative of said curve-fit.

22. The method as recited in claim 21, further comprising the step of setting said inner ring temperature adjustment and said outer ring temperature adjustment so as to cause said gas turbine to operate at said local minimum.

23. The method as recited in claim 22, further comprising the step of setting said inner ring temperature adjustment and said outer ring temperature adjustment so as to cause said gas turbine to operate along a local minimum line until reaching said preferred boundary.

24. The method as recited in claim 23, further comprising the step of setting said inner ring temperature adjustment and said outer ring temperature adjustment so as to cause said gas turbine to operate within a safety margin of said preferred boundary.

25. An apparatus for controlling the fuel flow to a plurality of rings in an annular combustor of a gas turbine, said apparatus comprising:

a turbine controller, wherein said turbine controller is adapted to generate a nominal operating temperature for each of the plurality of rings of the combustor;

a $NO_x$ regulator coupled to said turbine controller, wherein said $NO_x$ regulator is adapted to reduce $NO_x$ emission levels in the gas turbine by adjusting at least one ring temperature of the annular combustor;

an inner ring fuel adjuster coupled to said $NO_x$ regulator, wherein said inner ring fuel adjuster is adapted to adjust the inner ring temperature of the combustor within a specified limit; and an outer ring fuel adjuster coupled to said $NO_x$ regulator, wherein said outer ring fuel adjuster is adapted to adjust the outer ring temperature of the combustor within a specified limit.

26. The apparatus as recited in claim 25, wherein said $NO_x$ regulator further comprises a digital signal processor.

27. The apparatus as recited in claim 25, wherein said $NO_x$ regulator further comprises:

a microprocessor;

an analog to digital converter coupled to said microprocessor;

at least one digital to analog converter coupled to said microprocessor; and a multiplexor coupled to said analog to digital converter.

28. The apparatus as recited in claim 25, wherein said specified limit is in a range from about negative 65 degrees Celsius to about positive 65 degrees Celsius about a nominal operating temperature.

29. The apparatus as recited in claim 28, wherein said $NO_x$ regulator comprises a first algorithm, wherein said first algorithm is adapted to define an operational boundary of an inner ring temperature adjustment versus an outer ring temperature adjustment;

calculate a global minimum of operation of said inner ring fuel temperature adjustment versus said outer ring fuel temperature adjustment within a safety margin of said operational boundary, wherein the $NO_x$ emission level of the gas turbine is reduced; and regulate said ring temperatures to maintain said inner ring temperature adjustment and said outer ring temperature adjustment near said global minimum point of operation.

30. The apparatus as recited in claim 28, wherein said $NO_x$ regulator comprises a second algorithm, wherein said second algorithm is adapted to verify that the gas turbine is in an ABC mode of operation;

acquire $NO_x$ measurements during normal operation of said gas turbine, which correspond to at least six boundary points;

perform a polynomial curve-fit on said at least six boundary points to generate a $NO_x$ equation that corresponds with each of the ring temperatures;

calculate the global minimum point of operation wherein the gas turbine generates reduced $NO_x$ emission levels; and     regulate the gas turbine to operate at near the calculated global minimum operating point, while maintaining normal operation of the gas turbine.

31. A $NO_x$ regulator for reducing $NO_x$ emissions of a gas turbine, wherein said $NO_x$ regulator comprises an algorithm, wherein said algorithm is adapted to define an operational boundary of an inner ring temperature adjustment versus an outer ring temperature adjustment;

calculate a global minimum of operation of said inner ring fuel temperature adjustment versus said outer ring fuel temperature adjustment within a safety margin of said operational boundary, wherein the $NO_x$ emission level of the gas turbine is reduced; and     regulate said ring temperatures to maintain said inner ring temperature adjustment and said outer ring temperature adjustment near said global minimum point of operation, while maintaining normal operation of the gas turbine.

32. A $NO_x$ regulator, wherein said $NO_x$ regulator comprises an algorithm, wherein said algorithm is adapted to verify that the gas turbine is in an ABC mode of operation;

acquire $NO_x$ measurements during normal operation of said gas turbine, which correspond to at least six boundary points;

perform a polynomial curve-fit on said at least six boundary points to generate a $NO_x$ equation that corresponds with each of the ring temperatures;

calculate the global minimum point of operation wherein the gas turbine generates reduced $NO_x$ emission levels; and     regulate the gas turbine to operate at near the calculated global minimum operating point, while maintaining normal operation of the gas turbine.

* * * * *